3,326,632
PRODUCTION OF ION EXCHANGEABLE SUBSTANCES FROM MONTMORILLONITE CLAY MINERALS
Kazuo Hashizume, Usui-gun, Gunma-ken, Japan, assignor to Hojun Kogyo Kabushiki Kaisha, Usui-gun, Gunma-ken, Japan, a joint-stock company
No Drawing. Filed Jan. 23, 1963, Ser. No. 253,245
Claims priority, application Japan, Jan. 25, 1962, 37/3,390
4 Claims. (Cl. 23—111)

This invention relates to a novel method of producing ion exchangeable substances.

In general, substances which exhibit ion exchange phenomenon have been known for a long time. Particularly regarding cation exchange, methods of obtaining soft water through the use of natural zeolite and synthetic zeolite (U.S. Patent Nos. 914,405, 943,335 and 131,503), as well as peat, lignite, and brown coal (U.S. Patents Nos. 1,426,638, 1,793,670, and 2,094,569) have been published. Humic substances which are acid-treated have been disclosed (U.S. Patent No. 2,190,564), and such substances as tannin which is sulphonated (U.S. Patent. No. 2,198,379) and coal, brown coal, lignite, peat, anthracite, wood flour, coke, and tar pitch which are sulphonated or acid-treated (British Patent No. 450,574; U.S. Patents Nos. 2,198,393 and 2,206,007) have also been disclosed. Furthermore, insoluble aromatic compounds having imino radicals are also known (U.S. Patent No. 2,148,970).

Moreover, the recent rapid progress in research on ion exchangeable synthetic resins has resulted in research work on synthetic resins produced from tannin and formalin (U.S. Patent No. 2,094,359), or synthetic resins produced by co-condensation of gallic acid and cresol or resorcinol and formaldehyde (British Patent No. 450,308 and French Patent No. 796,796) and numerous other research work.

The present invention, differing from the above-cited various researches, contemplates the utilization of the variation in montmorillonite crystalline structure at the time of dehydration of the structural water due to high-temperature heating of a montmorillonite clay mineral.

It is an object of the present invention to provide a new method of producing ion exchangeable substances which comprises mixing an aqueous solution of a water-soluble organic compound with a montmorillonite clay mineral, e.g. montmorillonite, nontronite, beidellite, and saponite, which minerals are used as a basal structure, kneading the mixture, heating the mixture under atmospheric pressure or a higher pressure, cooling the same, then acid treating the same, washing the same with water, alkali treating the same, washing the same again with water, and drying the product. If desired, the treated substance is pulverized and classified by sieving or granulated to increase its value.

In carrying the method of this invention into practice, a water-soluble organic compound which readily combines with montmorillonite clay is caused, beforehand, to combine therewith. The resulting organic montmorillonite complex is then heated for a certain time at substantially the temperature for dehydration of the hydroxyl water of the montmorillonite clay, above the decomposition temperature of the organic compound, and subjected successively to cooling, acid treatment, water washing, alkali treatment, water washing, and drying. Then, the treated product is adjusted for particle size to produce a cation exchange product having a value of cation exchange capacity which, by varying the kind of water-soluble organic compound and the conditions of treatment, can be adjusted at will within the range of low to high cation exchange capacity.

In general, when a montmorillonite clay mineral comes in contact with water, it absorbs the water and swells remarkably. This swelling phenomenon is due to the infiltration of water molecules into the spaces between the montmorillonite crystals, the said infiltration occurring because of the especially strong affinity between montmorillonite crystals and water. Considered from the viewpoint of crystalline structure, this phenomenon may be described in following manner. Montmorillonite clay has a structure wherein layer lattices of (2 Si) (6 O) (2 Si), resulting from the tetrahedral coupling of silicon and oxygen, form a hexagonal network, and in the center of each hexagon, in the same plane, moreover, as the plane of alinement of oxygen of the vertex points not mutually connected, one (OH) is positioned. When two layer lattices of Si-O with (OH) positioned in this manner are coupled parallelly with their vertex directions in mutually opposed juxtaposition, a lattice point encompassed by six anions {4(O)+2(OH)} exists between the said lattices. In montmorillonite, in general, Al is positioned at this lattice point, and, sometimes, bivalent Fe or Mg is coupled in place of Al. Viewed as a whole, in the crystal of a montmorillonite clay mineral, a Gibbsite layer lattice of {4(OH)+2(O)}4Al{4(OH)+2(O)} exists between upper and lower layers of tetrahedral layer lattices consisting of (2 Si)6(O) (2 Si) and is coupled three dimensionally. Viewed in a planar manner from the vertical direction, a hexagonal network is thereby formed and exhibits so-called triple-layer lattice layers, and a so-called triple-layer structure, wherein this triple-layer lattice is repeated in parallel arrangement and stacked, is indicated.

Water molecules approaching these crystal lattice layers infiltrate into the space between the lattices to cause expansion from approximately 9 A. in the case of bone dry state to approximately 20 A. Furthermore, water molecules adhere also to both ends of the crystal lattice layers. This phenomenon produces the state of combination of water molecules and causes swelling.

When the Si in the above-mentioned Si-O layer lattice layer or the Al in the Gibbsite layer of $$\{4(OH)+2(O)\}4Al\{4(OH)+2(O)\}$$

has been substituted by another element, for example, Mg of Fe, a deficiency of "plus" electrical charge is created within this layer lattice, and, compensating for this deficiency, alkali metal ions or alkaline earth metal ions, or both, are retained by electrostatic force on the surface of the layer lattice. These ions so retained on the layer lattice surface become an ion-exchangeable base.

In view of the above consideration, the present invention resides in a method of producing ion exchangeable substances wherein the deficiency of electrical charge within the triple-layer lattice layers of montmorillonite clay is increased, and, at the same time, measures are taken to retain as great a quantity as possible of alkali metal ions or alkaline earth metal ions on the surface of the layer lattice.

When bentonite, which contains montmorillonite clay mineral as its principal constituent, is heated, the water causing swelling absorbed within the interlayer spaces of the abovesaid layer lattices dehydrates rapidly at 100 to 200 degrees C., the water of crystallization in the Gibbsite layer dehydrates at 600 to 700 degrees C., and the crystal structure of the montmorillonite undergoes transition. The ion exchange quantity of montmorillonite clay, when measured by the Schollenberger method of measuring ion exchange capacity, which will be described hereinafter, is normally 50 to 100 milliequivalents per 100 grams, and in the case of the original sample of bentonite, to be described in a production process set forth hereinafter, the exchange quantity was found to be 92 milliequivalents per 100 grams. Although the ion exchange capacity of bentonite heated to a temperature of from 600 to 700 degrees C.

similarly drops to between 5 and 35 milliequivalents per 100 grams, this capacity becomes 145 milliequivalents per 100 grams when this bentonite is subjected successively to boiling for 30 to 60 minutes in 10% hydrochloric acid, washing with water, and boiling for 30 to 60 minutes in 10% caustic soda solution.

It is well known that montmorillonite clay minerals couple with organic compounds such as amines which have, within their molecular structures, —OH, —COOH, or —$NH_2$ radicals, glycols, and proteins. The manner in which the said organic compounds couple is such that they infiltrate into the interlayer space between the mutually stacked crystal lattices of the montmorillonite clay minerals and form a uniform configurative structure in an orderly manner with the layer lattices.

When a compound formed by such coupling with bentonite is heated at a temperature above the decomposition temperature of the coupled organic compounds, these organic compounds existing between the layer lattices decompose into their compositional elements C, H, and O or molecules such as $CH_3$, $H_2$, $NO_2$, and CO. If this heating temperature is the temperature at which dehydration occurs in the Gibbsite layer of the montmorillonite, and if this heating is carried out, not in these reducing gases, but in a normal environment with ample oxygen, the surplus oxygen atoms remaining after the H has been released from the OH in the Gibbsite layer couple securely with the Al and assume a state whereby it is substantially difficult to dissolve them out even by subsequent acid treatment. As described above, when the organic bentonite complex is heated, its organic compounds decompose, and reducing gases are formed. In the dehydration which takes place within the environment of these reducing gases, the surplus oxygen atoms also combine to form compounds such as $H_2O$, $NO_2$, and $CO_2$, which enter into the reducing gas environment. The molecular structure of the montmorillonite after this heating assumes a different rearrangement, and the metals such as Al and Mg within the original Gibbsite layer are transformed by the subsequent acid treatment into a form whereby they can be readily dissolved out. These metals are dissolved out to a certain extent, and, at the same time, metals such as Fe and Mg coupled to the ends of the crystal lattices are removed. At the coupling positions of Al, Mg or Fe, surplus free bonds are formed, and a deficiency of positive charge is created within the layer lattices whereby they become activated.

Accordingly, following acid treatment, caustic soda treatment is carried out, and cristobalite adhering in an irregular manner as an extension of the SiO layer of the crystal lattice ends or in the interlayer space of the lattices and other $SiO_2$ are dissolved out and removed. At the same time, if $Na^+$ is caused to adhere to the crystal lattice, the contact surface with the liquid to be ion exchanged will increase, and the ion exchange capacity will be further increased.

In this process, moreover, the product which has been acid-treated, washed with water, and dried, prior to the carrying-out of alkali treatment, is activated to an extremely high degree, provided that the acid treatment conditions have been appropriate, and is highly suitable for refining of substances such as oils and fats, petroleum, and pigments and for decolorization.

The method of measuring static cation exchange capacity carried into practice according to the present invention is in accordance with the principle of the Schollenberger method. More specifically, a wad of filter cotton is inserted into an infusion tube and gently stuffed into the bottom thereof. Then, after the upper part of this filter cotton has been made level, a small quantity of distilled water is introduced into the infusion tube to determine whether or not the filtration speed is suitable. Next, 5 grams of the sample is placed into this infusion tube, and a reagent tube is so mounted at the top of the infusion tube as to be capable of instilling drops of the sample. Then 100 cc. of an aqueous solution of ammonium acetate of pH 7.0 value is introduced into the reagent tube. Next, the cock valve of the reagent tube is suitably opened and adjusted so as to cause the aqueous solution of ammonium acetate to drip onto and leach the sample in 8 to 12 hours.

Upon completion of leaching by ammonium acetate, the apparatus is dismounted. Then, after the reagent tube has been washed, 100 cc. of an ethyl alcohol solution of 80% concentration and pH 7.0 value is placed thereinto and, similarly as in the preceding step, is caused to drip with adjusted speed to flush the sample. Next, 100 cc. of a 10% solution of potassium chloride of pH 7.0 value is placed in the reagent tube and similarly caused to drip on the sample to accomplish leaching. The decoction so produced is subjected to distillation of ammonia in a Kjeldahl distillation apparatus. More specifically, 20 cc. of the decoction is taken and is distilled together with 10 cc. of a 33% solution of caustic potash and titrated with a certain quantity of 1/10 N caustic soda solution, and the result is converted into milliequivalents per 100 grams.

In order to indicate still more fully the nature of the present invention, a few examples of typical production processes according to the invention are set forth below, it being understood that these examples are presented as illustrative only, and that they are not intended to limit the scope of the invention.

Production Process 1

An aqueous solution of one part of glucose dissolved in 40 parts of water is mixed with 10 parts of montmorillonite clay (fine particles, 300-mesh or less, of bentonite powder; cation exchange capacity: 90 milliequivalents per 100 grams), and the mixture is thoroughly kneaded. Then, after this mixture has been left at rest for at least 10 hours, it is subjected to sudden heating in a heating furnace and heated for 30 to 60 minutes at 600 to 700 degrees C. and is then cooled slowly. The material so treated is then ground to a particle size of approximately 20 meshes or smaller size and subjected to boiling for 30 to 60 minutes in 10% hydrochloric acid and then to water washing so as to amply remove the acid content and cause the pH value to be from 5.0 to 5.2. The material so obtained is further subjected to boiling for 30 to 60 minutes in a 10% caustic soda solution of three times the quantity of the said material and then to ample water washing to lower the pH value to 10.0 to 10.2. The product of this final treatment is dried at a temperature of from 100 to 150 degrees C. to remove surplus water and is then classified by a sieve classifier into particles of 20- to 60-mesh, 60- to 200-mesh and smaller sizes.

The resulting product is a cation exchange material of black color, porous structure, and low apparent density having the following properties.

Apparent specific gravity, in the case of 20–60 mesh particle size, 0.30.
True specific gravity, 2.313.
Non-swelling property.
Static cation exchange capacity, 276 milliequivalents/100 grams.

Production Process 2

In place of the one part of glucose used in Production Process 1, one part of each substances such as aspartic acid, citric acid, tartaric acid, sodium glutamate, polyvinyl alcohol, CMC (sodium carboxymethylcellulose), gelatin, lignin, ethylene glycol, urea, hydroquinone, resorcine, succinic acid, oxalic acid, Rongalite (sodium surfoxylate formaldehyde) piperidine, quinoline, and diethylene glycol is dissolved in 40 parts of water, and the aqueous solution so formed is used in a process which, thereafter, is exactly the same as that described in Production Process 1. The respective ion exchangeable substances so produced have the properties indicated in the accompanying Table 1.

Other compounds which may be used include such aliphatic and aromatic compounds as hydrocarbons, monovalent and polyvalent alcohols, mono-amines and polyamines, mono-carboxylic acids and polycarboxylic acids and their esters, hydroxy acids and their derivatives, amino acids and their derivatives, and unsaturated compounds.

TABLE 1

| Water-Soluble Organic Compound Treated | Color of Product Formed | Apparent Specific Gravity | True Specific Gravity | Static Cation Exchange Capacity, Me/100 gram |
|---|---|---|---|---|
| Aspartic acid | Black | 0.31 | 3.104 | 178 |
| Citric acid | Gray | 0.30 | 2.326 | 214 |
| Tartaric acid | do | 0.29 | 2.426 | 257 |
| Sodium glutamate | do | 0.30 | 2.249 | 226 |
| Polyvinyl alcohol | Black | 0.27 | 2.356 | 295 |
| CMC | do | 0.33 | 2.553 | 183 |
| Gelatin | Gray | 0.65 | 2.208 | 76 |
| Lignin | Gray-black | 0.53 | 1.999 | 164 |
| Ethylene glycol | Yellow-white-gray | 0.33 | 3.781 | 148 |
| Urea | Brown-gray | 0.57 | 2.688 | 245 |
| Hydroquinone | Dark gray | 0.67 | 2.359 | 77 |
| Resorcine | Gray | 0.45 | 2.508 | 157 |
| Succinic acid | Light gray | 0.61 | 2.942 | 63 |
| Oxalic acid | Red-brown | 0.83 | 2.26 | 165 |
| Rongalite | Yellow | 0.67 | 2.486 | 84 |
| Piperidine | Yellow-white | 0.80 |  | 84 |
| Quinoline | do | 0.69 | 2.872 | 66 |
| Ethylene glycol | Dark gray | 0.87 | 2.624 | 26 |

*Production Process 3*

In place of the one part of glucose used in Production Process 1, one part of polyvinyl alcohol is dissolved in 40 parts of water, and the aqeuous solution so prepared is mixed and amply kneaded with 10 parts of the same bentonite as used in Production Process 1. After being left at rest for a certain time, this mixture is subjected to sudden heating and heated for 30 minutes at 700 to 750 degrees C., then to slow cooling. The material so treated is ground to a particle size of 20 meshes or smaller size, boiled for 6 hours in concentrated hydrochloric acid of five times the quantity of the said material, and then washed with water so as to amply remove the acid content and cause the pH value to be front 5.0 to 5.2. The material so treated is further subjected to boiling for 2 hours in a 20% caustic soda solution of five times the quantity of the said material and then to ample water washing to lower the pH value to 10.0 to 10.2. The product so treated is dried at a temperature of from 100 to 150 degrees C. to remove surplus water and is then classified by a sieve classifier into particles of 20- to 60-mesh, 60- to 200-mesh, and 200-mesh and smaller sizes.

The resulting product is an ion exchange material of a color ranging from gray to black, porous structure, non-swelling property, and low apparent density having the following properties.

Apparent specific gravity, in the case of 20–60 mesh particle size, 0.40.
Static cation exchange capacity, 350 to 400 milliequivalents/100 grams.

Although the present invention has been described in conjunction with certain particular embodiments thereof, it is to be understood that modifications and variations therein may be resorted to without departing from the spirit and scope of the invention, as those skilled in the art will readily understand, and such modifications and variations are considered to be within the purview and scope of the invention and appended claims.

What is claimed is:

1. A method of producing ion exchangeable substances which comprises: mixing an aqueous solution of a water-soluble organic compound with a montmorillonite clay mineral which is utilized as the basal structure, said organic compound being one which combines with the montmorillonite clay mineral to form an organic-montmorillonite complex; kneading the mixture so formed, subjecting the mixture so kneaded to heating at a temperature from 200 through 1000 degrees C., inclusive, under a pressure which is at least atmospheric and for a period at least sufficient to decompose said organic compound; cooling the resulting decomposition product; boiling the product in an acid selected from the group consisting of sulfuric acid and hydrochloric acid for a period of time from 30 minutes to 6 hours; washing the resulting boiled product with water so as to remove the acid from said product until the pH of said product is between 5.0 and 5.2; boiling the washed material for a period of time from 30 minutes to 2 hours in an alkaline solution of an alkaline substance selected from the group consisting of caustic soda, sodium carbonate, and caustic potash; washing the product so obtained with water to lower the pH value of said product to between 10.0 and 10.2; and then drying the washed product.

2. The process of claim 1 wherein the montmorillonite clay mineral is one selected from the group consisting of montmorillonite, nontronite, beidellite and saponite.

3. A method of producing ion exchangeable substances according to claim 1, in which the water soluble organic compound is selected from the group consisting of hydrocarbons, monovalent and polyvalent alcohols, monoazines and polyazines, mono-carboxylic acids and polycarboxylic acids and their esters, hydroxy acids, and amino acids.

4. A method of producing ion exchangeable substances according to claim 3, in which the water-soluble organic compound is selected from the group consisting of aspartic acid, citric acid, tartaric acid, sodium glutamate, polyvinyl alcohol, sodium carboxymethylcellulose, gelatin, lignin, ethylene glycol, urea, hydroquinone, resorcine, succinic acid, oxalic acid, sodium surfoxylate formaldehyde, piperidine, quinoline, and diethylene glycol.

References Cited

UNITED STATES PATENTS

| 2,951,087 | 8/1960 | Hauser | 260—448 |
| 2,966,506 | 12/1960 | Jordon | 23—112 X |
| 3,201,197 | 6/1962 | Showalter | 23—112 |

OSCAR R. VERTIZ, *Primary Examiner.*

E. J. MEROS, *Assistant Examiner.*